United States Patent

[11] 3,592,973

[72] Inventor Derek Keith Gray
Barnet, England
[21] Appl. No. 798,360
[22] Filed Feb. 11, 1969
[45] Patented July 13, 1971
[73] Assignee Sontranic Limited
Edgware, Middlesex, England
[32] Priority May 31, 1968
[33] Great Britain
[31] 26317/68

[54] CODE CARDS FOR AUTOMATIC TELEPHONE DIALLING
10 Claims, 5 Drawing Figs.

[52] U.S. Cl. .......... 179/90 CS, 235/61.12, 178/112
[51] Int. Cl. .......... G06k 21/04, G11b 23/00, Ho4m 1/26
[50] Field of Search .......... 178/111, 112; 235/61.12; 93/1; 273/139; 346/135; 35/69; 179/90; 250/237

[56] References Cited
UNITED STATES PATENTS 3,114,036 12/1963 E. R. Andregg .......... 235/61.12

*Primary Examiner*—Kathleen H. Claffy
*Assistant Examiner*—William A. Helvestine
*Attorney*—Woodhams, Blanchard and Flynn

ABSTRACT: A card blank for providing a coded dialling card for card-dialling apparatus in automatic telephone systems has a plurality of recessed apertures therethrough each obscured by an opaque screen removably mounted in the recessed portions of the apertures, the maximum transverse dimensions of the screen being substantially identical with the minimum transverse dimensions of the unrecessed portion. The screens substantially prevent all direct illumination from passing through the apertures.

Figure 1:
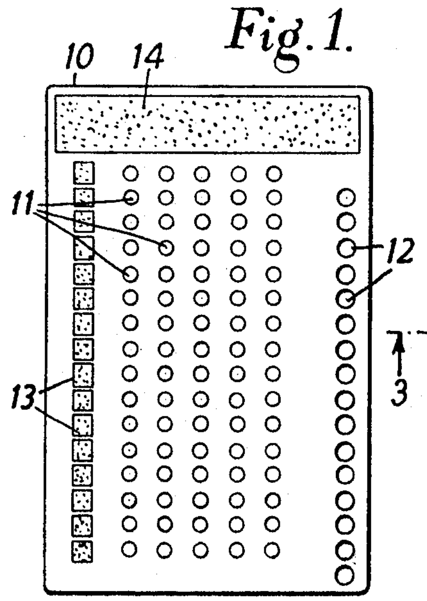

INVENTOR
DEREK KEITH GRAY

BY
Woodhams, Blanchard & Flynn
ATTORNEYS

CODE CARDS FOR AUTOMATIC TELEPHONE DIALLING

The present invention relates to improved code cards for automatic telephone dialling and is concerned with code card blanks having provision whereby apertures can be formed therein by pressing out regions so preformed as to facilitate their removal.

Code cards in which an array of apertures are punched representing information are used for data storage and retrieval. Such card are also employed for controlling machine tools and manufacturing processes. The required apertures are punched from the card by means of a simple tool, the apertures being distributed over the card according to a predetermined code.

Apart from the above-mentioned application, card dialling for telephones is expected to become increasingly used. Enlarged telephone dialling facilities, known as subscriber trunk dialling, have made it possible for a subscriber himself to dial direct to other subscribers where previously an operator was required to make the connections. However to make a connection with another subscriber it may be necessary to dial as many as 16 digits. Clearly, the more digits which require manual dialling, the greater is the risk of dialling errors and of course the more time it takes. The use of automatic dialling using appropriately punched code cards would eliminate such errors and reduce the time to a minimum. Each subscriber requiring such facilities would be provided with a suitable automatic dialling apparatus additional to present manually operated dial telephones. A supply of blank code cards would be provided. The subscriber would then punch out apertures in the cards representing telephone numbers, according to a set code.

Automatic dialling apparatus proposed for use with coded cards comprise an electro-optical instrument in which the card is scanned by a spot of light. Photosensitive devices detect the presence of and locate apertures punched in the card. The outputs from the photosensitive devices cause a calling signal to be generated in the form of impulses corresponding to the telephone number required.

Automatic dialling apparatus satisfactorily operates only when the apertures are correctly positioned on the code card. Each subscriber could be provided with a suitable punching tool, although at considerable expense. To reduce such expense, preformed code cards usually of plastics material have been proposed.

In a known card blank of plastics material, an array of preformed regions is provided such that their removal by, for example pressing out with a pencil point, is facilitated. Such a card blank enables a telephone subscriber to provide himself with a card having apertures appropriately distributed in accordance with a given code to represent the number of a given subscriber. In the known card blank, preformation of the said regions consists, for each region, in three narrow arcuate slots around the periphery of a circle, the slots having between adjacent ends a small web. The three webs thereby support a central disc which can readily be pressed out (breaking the webs), to leave a circular aperture in the card. This type of card has a disadvantage in that the slots provided at each aperture site allow light to pass to the associated photosensitive device. Such light received by the photosensitive devices is undesirable and can lead to incorrect numbers being obtained.

The object of the present invention is therefore to provide a preformed punched code card, in which apertures are provided having removable central regions which prevent substantially all stray light from passing through the card. According to the present invention, therefore, there is provided a card bland suitable for use in providing a coded dialling card for card-dialling apparatus in automatic telephone systems, the blank being of plastics material and having apertures therethrough in predetermined locations, each aperture being recessed and having an associated aperture-masking opaque screen supported in the recessed portion by legs integral with the body of the card and the screen, the maximum transverse dimensions of the screen being substantially identical with the minimum transverse dimensions of the other portion of the aperture.

A card blank according to the invention can be made by molding from the thermoplastics materials. Since the maximum dimensions of the screen and the minimum dimensions of the said other portion of the aperture are substantially equal, card-dialling apparatus for use therewith can be arranged in such a manner that light from a scanning light spot is substantially completely prevented from passing through the apertures to the photosensitive devices.

Figure 2:
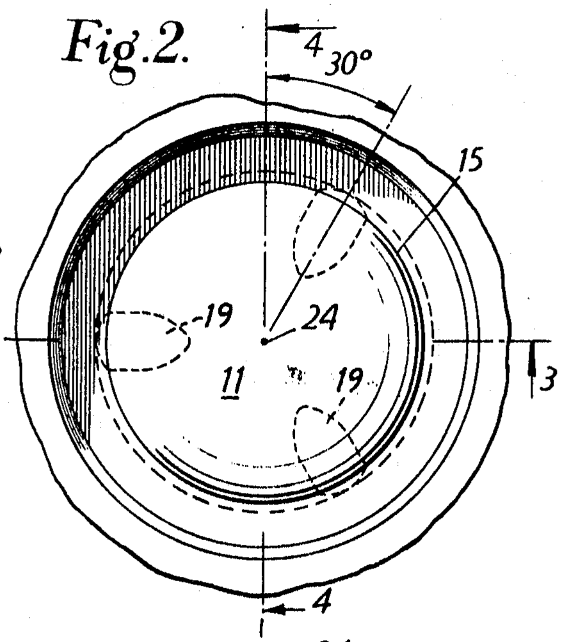
Figures 3, 4, 5:
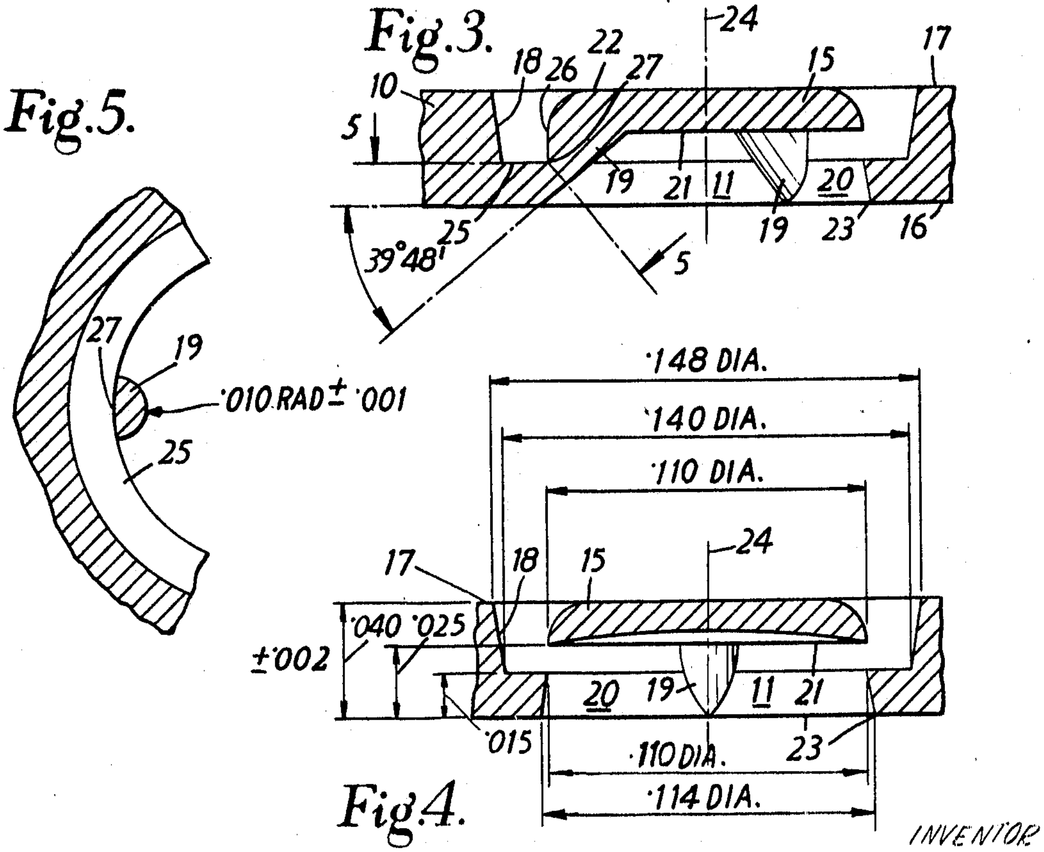

The present invention will now be described by way of example with reference to the accompanying drawings, in which:

FIG. 1 is a plan view of a code-card blank embodying the invention,

FIG. 2 is an enlarged plan view of an aperture and screen in the blank of FIG. 1, FIG. 3 is a section of the aperture and screen taken along the line 3–3 of FIG. 2, FIG. 4 is a section of the aperture and screen taken along the line 4–4 of FIG. 2, the screen being modified to have a concave surface and, FIG. 5 is a part plan view and part cross section of the aperture and a supporting leg, taken along the line 5–5 of FIG. 2.

It will be appreciated that the dimensions given on the drawings are presented as examples only.

The invention will now be described initially with reference to FIG. 1, which shows in plan view a complete code card 10 embodying the invention. The card can be conveniently made by moulding from thermoplastics materials. The code card includes a regular array of preformed apertures 11, the detailed structure of which will be described later. A total of eighty apertures is provided, the apertures being arranged in 16 rows, and five columns. By removing the central portions (not shown in FIG. 1) from selected apertures, the code card can be programmed for any required telephone number, using any suitable code. The card shown can be programmed for any telephone number not exceeding 16 digits.

Further apertures 12, referred to as locating apertures, are provided adjacent one long edge of the code card 10. The purpose of the locating apertures is to cooperate with a catch provided in automatic dialling apparatus, the operation of which will be described briefly later.

Spaces 13 and 14 are provided on one face of the code card 10, which face will be referred to, for convenience as the front face. The spaces have surfaces which are capable of retaining information written for example by ballpoint pens. The column of spaces 13 may be used for writing in a telephone number, the space 14 being used for the corresponding subscriber's name. The spaces 13 and 14 can be conveniently prepared during moulding by injection blasting.

In use, the code card is inserted in a slot provided in an automatic dialling apparatus, (not shown). The apparatus includes a scanning system located on one side of the slot, and a series of photosensitive devices arranged on the opposite side of the slot. In practice, scanning system can include a series of fiber optical waveguides which are spaced apart corresponding to the spacing between apertures 11 in each row of the cord card 10. When the apparatus has examined each row of apertures, the card is allowed to move further into the slot to allow the next row of apertures to be examined. In the simplest form of automatic apparatus, the card is allowed to fall into the slot in a step-by-step manner. The code card is located in the slot relative to the waveguides and photosensitive devices by means of a solenoid operated catch. The catch is in the form of a movable plunger which engages in an aperture 12 of the code card 10. Each row of apertures 11 is held in register with the waveguides and photosensitive devices for a given time, and them the plunger is retracted from the associated aperture 12. The code card can then fall further into the slot, until arrested by the plunger reengaging in the next aperture 12. The plunger remains retracted from the aperture for several milliseconds. A suitable form of apparatus is described in British Pat. No. 1,193,207 and corresponding U.S. application Ser. No. 780,104, filed Nov. 29, 1968.

The detailed structure of each aperture 11 will now be described with reference to the remaining FIGS. 2 to 5. Each aperture 11 is preformed and includes a press-out screen 15 which masks the aperture. The screen 15 can be readily detached from the aperture 11 by pressing it with any pointed instrument, for example a pencil point.

As will be seen from FIG. 2, the aperture 11 and screen 15 are of circular section. The aperture 11 extends through the code card 10 from a front face 16 to a rear face 17 of the card. The aperture 11 has a shoulder therein which defines a recessed portion 18 extending partly into the card from the rear face 17. The recess is coaxial with the aperture 11. It can be seen from the drawings therefore that in section, the aperture, the aperture is stepped. The screen 15 has a maximum diameter substantially equal to the minimum diameter of the unrecessed portion of the aperture, so that light is prevented from escaping past the screen. In the example shown, both the screen and the minimum diameter of the unrecessed portion of the aperture have a diameter of 0.110 inches.

The screen 15 is supported in the recessed portion and is secured to the code card by three supporting legs 19 integral with the body of the card and the screen. Each leg 19 integral from the wall surface 20 of the aperture 11 to the inner surface 21 of the screen 15. The legs support the screen coaxially with the aperture 11. In addition, the legs are so dimensioned that the outer surface 22 of the screen 15 is coplanar with the rear face 17 of the code card 10. The legs 19 are equally spaced circumferentially in the aperture, and hence each leg is separated from the adjacent legs by 120°.

The inner surface 25 of the recess 18 lies in a plane substantially parallel to the plane of the code card 10. The legs 19 extending from the wall 20 of the aperture to the screen 15 include a surface 26 which makes an angle with the surface 25 of the recess 18 substantially equal to a tight angle. A relatively sharp corner or notch 27 is thus formed in the leg, which acts to raise the stress when a force is applied to the screen. In consequence, fracture of the legs will be initiated from the corner 27. The legs are dimensioned such that a force applied to the screen of a magnitude approximately 2¼—3½ lbs. is sufficient to detach the screen. Furthermore, the legs are designed to withstand the stresses developed if the card is inadvertently bent. It will be appreciated that to detach the screen, the force is applied in the direction of the rear face 17 of the code card.

Since the screen 15 has a diameter equal to the diameter of the unrecessed portion of the aperture 11, substantially all light from a scanning light spot is prevented from passing through the aperture by the screen. Furthermore, the diameter of the unrecessed portion of the aperture 11 is arranged to be larger than the diameter of fiberoptical waveguides used in the automatic dialling apparatus employed. However, the possibility of light bypassing the screen can be further reduced. For example, the inner surface 21 can be made concave as shown in FIG. 4. In addition, the aperture 11 can be tapered, so that the wall 20 converges towards the axis of the aperture, as shown in FIGS. 2 and 3 of the accompanying drawings. With this arrangement, light striking the screen and wall of the aperture is reflected towards the light source of the automatic dialling apparatus.

It will be appreciated that the code card of the present invention if of simple construction, and c an be molded in one operation using known moulding methods. A mold comprising two sections would be employed.

I claim:

1. A card blank for providing a coded dialling card for a card-dialling apparatus including photoelectic sensors in automatic telephone apparatus, comprising:
- a main body in the form of a plate having a set of preformed apertures passing therethrough, said main body being of plastics material;
- each of said apertures having a larger part at one end thereof and a smaller part at the other end;
- a wall portion of said body surrounding each of said apertures having a stepped configuration defining a shoulder which separates the larger and the smaller parts of each said aperture;
- an opaque screen positioned within each said aperture and axially located to one side of said shoulder and disposed in the larger part of said aperture, said opaque screen being of at least the same dimensions as the smaller part of said aperture and also being centered relative to said smaller part thereby wholly to mask said smaller part; and
- a plurality of legs interconnecting each said screen to said body to hold each said screen in position in its respective aperture while permitting said screen to be detached from said body by fracture of said legs, the screens and their legs being of plastics material integrally connected with said body.

2. A card blank according to claim 1, wherein said main body, said legs and said screen are integrally molded from a thermoplastics material.

3. A card blank according to claim 1, wherein the screen has a thickness substantially less than the thickness of the main body, and said legs being provided with a sharp notch or corner which functions as a stress raiser to facilitate fracture of the legs.

4. A card blank according to claim 1, wherein the surface of said screen facing outwards of said main body is substantially coplanar with the corresponding surface of the body of the card.

5. A card blank according to claim 1, wherein said legs extend from the surface of said screen facing said shoulder to the stepped part of the wall of the said aperture.

6. A card blank according to claim 1, wherein the number of legs connected to each screen is three, said legs being equally spaced around the perimeter of the screen.

7. A card blank according to claim 6, wherein the aperture and the screen are of circular shape, and wherein the wall portion surrounding the smaller part of said aperture is frustoconical with its innermost end adjacent said shoulder being the smaller dimension.

8. A card blank according to claim 7, wherein the said surface of the screen facing said shoulder is, at least in part, concave.

9. A card blank according to claim 7, wherein the wall portion surrounding the larger part of said aperture is frustoconical with its innermost end adjacent said shoulder being the smaller dimension.

10. A card blank according to claim 1, wherein the said apertures are arranged in a plurality of rows and for each row there is provided a locating aperture to receive locating means of a card-dialling apparatus the locating apertures being staggered relative to the rows of the first said apertures.